(12) United States Patent
Wang (10) Patent No.: US 9,367,202 B2
(45) Date of Patent: Jun. 14, 2016

(54) INFORMATION PROCESSING METHOD AND ELECTRONIC DEVICE

(71) Applicants: Lenovo (Beijing) Limited, Beijing (CN); Beijing Lenovo Software Ltd., Beijing (CN)

(72) Inventor: Zhixiang Wang, Beijing (CN)

(73) Assignees: Beijing Lenovo Software Ltd. (CN); Lenovo (Beijing) Limited (CN)

(*) Notice: Subject to any disclaimer, the term of this patent is extended or adjusted under 35 U.S.C. 154(b) by 39 days.

(21) Appl. No.: 14/460,430

(22) Filed: Aug. 15, 2014

(65) Prior Publication Data

US 2015/0269944 A1 Sep. 24, 2015

(30) Foreign Application Priority Data

Mar. 24, 2014 (CN) .......................... 2014 1 0112258

(51) Int. Cl.
| | |
|---|---|
| *G06F 17/27* | (2006.01) |
| *G06F 3/048* | (2013.01) |
| *G06F 3/16* | (2006.01) |
| *G06F 3/01* | (2006.01) |
| *G06F 3/041* | (2006.01) |
| *G10L 15/00* | (2013.01) |
| *G10L 17/00* | (2013.01) |
| *G10L 15/26* | (2006.01) |
| *G10L 13/00* | (2006.01) |

(Continued)

(52) U.S. Cl.
CPC ........ *G06F 3/04812* (2013.01); *G06F 3/04842* (2013.01); *G10L 15/22* (2013.01); *G10L 2015/226* (2013.01)

(58) Field of Classification Search
CPC ......... G06F 9/4443; G06F 3/16; G06F 3/048; G06F 17/2785; G10L 13/08; G10L 15/265; G10L 17/005; H04N 5/44515; H04N 5/4403; G08B 13/196218
See application file for complete search history.

(56) References Cited

U.S. PATENT DOCUMENTS

| | | | | |
|---|---|---|---|---|
| 8,117,034 B2* | 2/2012 | Gschwendtner | ........ | G10L 15/22 704/235 |
| 8,244,103 B1* | 8/2012 | Shore | ..................... | G11B 27/34 386/278 |

(Continued)

*Primary Examiner* — Paras D Shah
*Assistant Examiner* — Anne Thomas-Homescu
(74) *Attorney, Agent, or Firm* — Schwegman, Lundberg & Woessner, P.A.

(57) ABSTRACT

The present disclosure provides an information processing method for addressing the technical problem that an operation mode of a voice input interface of a conventional electronic device is not flexible. The method comprises steps of: obtaining a voice input trigger operation by an sensing unit; in response to the voice input trigger operation, starting a voice processing system, and displaying a voice indicator in a display unit, the voice indicator occupying a portion of the display area; obtaining an input operation for moving the voice indicator by the sensing unit; making a response to the input operation for moving; controlling movement of the voice indicator within the display area based on the input operation for moving; determining a corresponding control command based on parameter information of the input operation for moving, the control command being used for controlling a processing procedure of the voice processing system. The present disclosure also provides an electronic device for implementing the method.

18 Claims, 5 Drawing Sheets

(51) Int. Cl.
*G10L 13/08* (2013.01)
*G10L 21/00* (2013.01)
*G10L 25/00* (2013.01)
*G06F 3/0481* (2013.01)
*G06F 3/0484* (2013.01)
*G10L 15/22* (2006.01)
*H04N 5/445* (2011.01)
*H04N 5/44* (2011.01)
*H04N 7/18* (2006.01)

(56) References Cited

U.S. PATENT DOCUMENTS

| | | | | |
|---|---|---|---|---|
| 2008/0222174 A1* | 9/2008 | Lyman | | H04L 12/581 |
| 2009/0253463 A1* | 10/2009 | Shin | | H04M 1/72583 455/563 |
| 2011/0080356 A1* | 4/2011 | Kang | | G06F 3/0486 345/173 |
| 2011/0285656 A1* | 11/2011 | Yaksick | | G06F 3/04886 345/173 |
| 2011/0301943 A1* | 12/2011 | Patch | | G10L 15/26 704/9 |
| 2012/0209608 A1* | 8/2012 | Lee | | G10L 15/22 704/246 |
| 2013/0033643 A1* | 2/2013 | Kim | | G06F 3/017 348/563 |
| 2013/0033649 A1* | 2/2013 | Kim | | G06F 3/017 348/734 |
| 2013/0035942 A1* | 2/2013 | Kim | | G06F 3/167 704/275 |
| 2013/0176232 A1* | 7/2013 | Waeller | | B60K 35/00 345/173 |
| 2014/0119581 A1* | 5/2014 | Tsingos | | H04S 3/008 381/300 |
| 2014/0218537 A1* | 8/2014 | Nepo | | G08B 15/004 348/158 |
| 2014/0237367 A1* | 8/2014 | Jung | | G06F 3/167 715/728 |
| 2014/0240262 A1* | 8/2014 | Paul | | G09B 21/006 345/173 |
| 2014/0366709 A1* | 12/2014 | Uemura | | G10H 1/0025 84/603 |
| 2014/0376728 A1* | 12/2014 | Ramo | | G06T 19/006 381/56 |
| 2015/0033163 A1* | 1/2015 | Hinkel | | G06F 3/04817 715/765 |
| 2015/0149168 A1* | 5/2015 | Stent | | G06F 17/243 704/235 |
| 2015/0149180 A1* | 5/2015 | Lee | | G06F 17/211 704/260 |
| 2015/0186008 A1* | 7/2015 | Hicks | | G06F 3/0482 715/765 |
| 2015/0217186 A1* | 8/2015 | Kaku | | A63F 13/12 463/9 |
| 2015/0261496 A1* | 9/2015 | Faaborg | | G06F 3/167 715/728 |
| 2015/0339044 A1* | 11/2015 | Matsuda | | G06F 3/0488 715/702 |

* cited by examiner

INFORMATION PROCESSING METHOD AND ELECTRONIC DEVICE

CROSS-REFERENCE TO RELATED APPLICATION

This application claims priority the benefit of priority under 35 U.S.C. 119 to Chinese Application No. 201410112258.0, filed on Mar. 24, 2014, which application is incorporated herein by reference in its entirety.

TECHNICAL FIELD

The present disclosure relates to an electronic technology field, and particularly, to an information processing method and an electronic device.

BACKGROUND

With the rapid development of science and technology as well as the increasingly competitive market, performance and appearance of an electronic device has been significantly improved. With its advantages such as being compact and lightweight, easy to carry, strong entertainment etc., the electronic device such as an intelligent mobile phone, tablet computer etc., is attracting more and more people, and has become the electronic device that is essential for people to carry on themselves for both work and live purposes. There are more and more things that the user can use the electronic device to do. For example, the user can use the intelligent mobile phone or the tablet computer to send voice messages or search information by a voice input.

Usually, when people want to use voice functions of the electronic device, they need to call up a voice input indicator of a corresponding voice processing system, and then perform the voice input or other operations. However, when the voice input indicator is called up, a corresponding voice input interface is usually a screen exclusive interface, namely the voice input interface occupies almost the whole display area of the display screen, shielding other application interfaces in the display screen, so that at this time, operations can only be performed on this voice input interface. In addition, current operation mode of the voice input interface is mainly based on a click operation, such as clicking a Repeat button to re-input voice, or clicking a Cancel button to pause the voice input. However, in a case where the voice input interface is the screen exclusive interface, its display range is larger, and corresponding function buttons are more dispersed in the display interface. In this case, in order to click on a function icon in the voice input interface, the user needs to hold the electronic device by one hand and perform operations on the voice input interface by the other hand. As such, the user can click the dispersed function icons with a relatively high accuracy, so as to implement corresponding functions. Thus, in many cases, the user may need to operate a number of times by his both hands for completing continuous processing steps.

Thus, there exists a technical problem conventionally that the operation mode of the voice input interface of the electronic device is not flexible.

SUMMARY OF THE INVENTION

An embodiment of the present invention proposes an information processing method, which addresses the technical problem of the operation mode of the voice input interface of the conventional electronic device being not flexible.

Embodiments of this disclosure provide an information processing method applied in an electronic device, the electronic device comprising a display unit, a sensing unit and a voice processing system, the display unit comprising a display area, and the method comprising:

obtaining a voice input trigger operation by the sensing unit;

in response to the voice input trigger operation, starting the voice processing system and simultaneously displaying a voice indicator in the display unit, the voice indicator occupying a portion of the display area, the voice processing system being used for processing voice input information obtained by the electronic device, the voice indicator being used for indicating a processing procedure of the voice processing system;

obtaining, by the sensing unit, an input operation for moving the voice indicator;

making a response to the input operation for moving;

controlling movement of the voice indicator within the display area based on the input operation for moving;

determining a corresponding control command based on parameter information of the input operation for moving, the control command being used for controlling the processing procedure of the voice processing system.

Preferably, the voice processing system has M processing stages corresponding to M prompt effects which are different from each other, and wherein M is a positive integer no less than 1. After determining the corresponding control command based on parameter information of the input operation for moving, the method further comprises:

during the procedure of processing the voice input information by the voice processing system, displaying on a real-time basis, in a region identified by the voice indictor, the i-th prompt effect corresponding to an i-th processing stage in which the voice processing system is situated, wherein i is a positive integer no greater than M.

Preferably, the voice processing system has M processing stages corresponding to M prompt effects which are different from each other, and each of the M processing stages has a corresponding output content, wherein M is a positive integer no less than 1. After determining the corresponding control command based on parameter information of the input operation for moving, the method further comprises:

during the procedure of processing the voice input information by the voice processing system, obtaining on a real-time basis j-th output content corresponding to a j-th processing stage in which the voice processing system is situated, and overlaying the j-th output content on the j-th prompt effect corresponding to the j-th processing stage in which the voice processing system is situated for displaying in the region identified by the voice indictor, wherein j is a positive integer no greater than M.

Preferably, each of the M processing stages have N corresponds to control commands, and different processing stages correspond to different control commands. Before determining the corresponding control command based on the parameter information of the input operation for moving, the method further comprises:

during the procedure of processing the voice input information by the voice processing system, displaying on a real-time basis, around the voice indictor, command logos of the N control commands corresponding to the processing stage in which the voice processing system is situated according to a predetermined relationship, so that the corresponding control command can be determined based on the parameter information of the input operation for moving.

Preferably, the predetermined relationship is determined according to a display position corresponding to an ending time of the voice indicator and the N control commands.

Preferably, obtaining the voice input trigger operation by the sensing unit comprises:

obtaining a sliding operation trajectory by the sensing unit;

when it is determined that a sliding operation corresponding to the sliding operation trajectory is an operation that goes away from a first edge of the display area, determining the sliding operation as the voice input trigger operation, wherein the first edge is an edge in a horizontal direction of the edges contained in the display area.

Preferably, displaying the voice indicator in the display unit comprises:

determining a corresponding display position of the voice indicator in the display area, according to the end point of the sliding operation trajectory; and displaying the voice indicator based on the display position.

Embodiments of this disclosure provide an electronic device that comprises a display unit, a sensing unit and a voice processing system, the display unit comprising a display area, and the electronic device comprising:

a first acquisition unit configured to obtain a voice input trigger operation by the sensing unit;

a first response unit configured to, in response to the voice input trigger operation, start the voice processing system and simultaneously display a voice indicator in the display unit, the voice indicator occupying a portion of the display area, the voice processing system being used for processing voice input information obtained by the electronic device, the voice indicator being used for indicating a processing procedure of the voice processing system;

a second acquisition unit configured to obtain, by the sensing unit, an input operation for moving the voice indicator;

a second response unit configured to make a response to the input operation for moving;

a control unit configured to control movement of the voice indicator within the display area based on the input operation for moving;

a determining unit configured to determine a corresponding control command based on parameter information of the input operation for moving, the control command being used for controlling the processing procedure of the voice processing system.

Preferably, the voice processing system has M processing stages corresponding to M prompt effects which are different from each other, and wherein M is a positive integer no less than 1. The electronic device further comprises a first processing unit configure to, during the procedure of processing the voice input information by the voice processing system, display on a real-time basis, in a region identified by the voice indictor, i-th prompt effect corresponding to an i-th processing stage in which the voice processing system is situated, wherein i is a positive integer no greater than M.

Preferably, the voice processing system has M processing stages corresponding to M prompt effects which are different from each other, and each of the M processing stages has corresponding output content, wherein, M is a positive integer no less than 1. The electronic device further comprises a second processing unit configure to, during the procedure of processing the voice input information by the voice processing system, obtain on a real-time basis j-th output content corresponding to a j-th processing stage in which the voice processing system is situated, and overlay the j-th output content on the j-th prompt effect corresponding to the j-th processing stage in which the voice processing system is situated for displaying in the region identified by the voice indictor, wherein j is a positive integer no greater than M.

Preferably, each of the M processing stages corresponds toN control commands, and different processing stages correspond to different control commands. The electronic device further comprises a third processing unit configure to, during the procedure of processing the voice input information by the voice processing system, display on a real-time basis, around the voice indictor, command logos of the N control commands corresponding to the processing stage in which the voice processing system is situated according to a predetermined relationship, so that the corresponding control command can be determined based on the parameter information of the input operation for moving.

Preferably, the predetermined relationship is determined according to a display position corresponding to an ending time of the voice indicator and the N control commands.

Preferably, the first acquisition unit is further configured to obtain a sliding operation trajectory by the sensing unit; when it is determined that a sliding operation corresponding to the sliding operation trajectory is an operation that goes away from a first edge of the display area, determine the sliding operation as the voice input trigger operation, wherein the first edge is an edge in a horizontal direction of the edges contained in the display area.

Preferably, the first response unit is further configured to: determine a corresponding display position of the voice indicator in the display area, according to an end point of the sliding operation trajectory; and displaying the voice indicator based on the display position.

In the embodiments of the invention, when the voice processing system is called up, the corresponding voice indicator occupies a portion of the display area, and does not completely shield other application interfaces in the display unit and thus the electronic device has a better display effect. In addition, when the input operation for moving is obtained, the corresponding control command can be determined based on the parameter information of the input operation for moving, and then the processing responded by the voice processing system can be controlled accordingly. That is, movement of the voice indicator within the display area can be controlled based on the input operation for moving, and the control command can be determined based on parameters of the input operation for moving. For example, when the voice content corresponding to the voice indicator is a telephone number, if the input operation for moving is an operation to slide the voice indicator from a middle position in the display area to a top position, it can be determined that the control command corresponding to the parameters of the input operation for moving is a command to place a call to the telephone number. Thus, when a user holds the electronic device by one hand, he only needs to arrange the voice indicator to different positions in the display area by sliding his thumb, in order to determine corresponding control commands, whereby controlling the voice processing system to perform the control commands, and thus implementing corresponding functions. Such an operation mode is more flexible for the user, has better user experience and more sensitive response of the electronic device, and provides richer response ways.

DETAILED DESCRIPTION

The information processing method according to the embodiments of the present invention can be applied in an electronic device. The electronic device comprises a display unit, a sensing unit and a voice processing system. The display unit comprises a display area. The method comprises: obtaining a voice input trigger operation by the sensing unit; in response to the voice input trigger operation, starting the voice processing system and simultaneously displaying a voice indicator in the display unit, the voice indicator occupying a portion of the display area, the voice processing system being used for processing voice input information obtained by the electronic device, the voice indicator being used for indicating a processing procedure of the voice processing system; obtaining, by the sensing unit, an input operation for moving the voice indicator; making a response to the input operation for moving; controlling movement of the voice indicator within the display area based on the input operation for moving; determining a corresponding control command based on parameter information of the input operation for moving, the control command being used for controlling the processing procedure of the voice processing system.

In the embodiments of the invention, when the voice processing system is called up, the corresponding voice indicator occupies a portion of the display area, and does not completely shield other application interfaces in the display unit, and thus the electronic device has a better display effect. In addition, when the input operation for moving is obtained, the corresponding control command can be determined based on parameter information of the input operation for moving, and then the processing responded by the voice processing system can be controlled accordingly. That is, movement of the voice indicator within the display area can be controlled based on the input operation for moving, and the control command can be determined based on parameters of the input operation for moving. For example, when the voice content corresponding to the voice indicator is a telephone number, if the input operation for moving is an operation to slide the voice indicator from a middle position in the display area to a top position, it can be determined that the control command corresponding to the parameters of the input operation for moving is a command to place a call to the telephone number. Thus, when a user holds the electronic device by one hand, he only needs to arrange the voice indicator to different positions in the display area by sliding his thumb, in order to determine corresponding control commands, whereby controlling the voice processing system to perform the control commands, and thus implementing corresponding functions. Such an operation mode is more flexible for the user, has better user experience and more sensitive response of the electronic device, and provides richer response ways.

The objects, technical solutions and advantages of the present invention will be more apparent, with reference to the following clear and comprehensive description of implementations of the present invention in conjunction with the accompanying drawings. Obviously, the described embodiments are just a part of the embodiments of the present invention, but not all embodiments. Upon the teaching of the embodiments of the present invention, all of other embodiments obtained by those ordinary skilled in the art without creative effort are within the protection scope of the present invention.

In the embodiments of the invention, the electronic device may be various electronic devices such as a PC (Personal Computer), a notebook, PAD (tablet PC), a mobile phone and etc. This disclosure does not make any limitation in this regard.

Further, the term "and/or" herein is just used for describing association relationships of contextual objects, which represents there may be three types of relationships. For example, A and/or B, may mean the following three cases: only A exists, both A and B exist, or only B exists. In addition, this characters "/" as used herein represents an "or" relationship of contextual objects.

Below, the preferred embodiments of the present invention will be described in detail in conjunction with the accompanying drawings.

Figure 1:
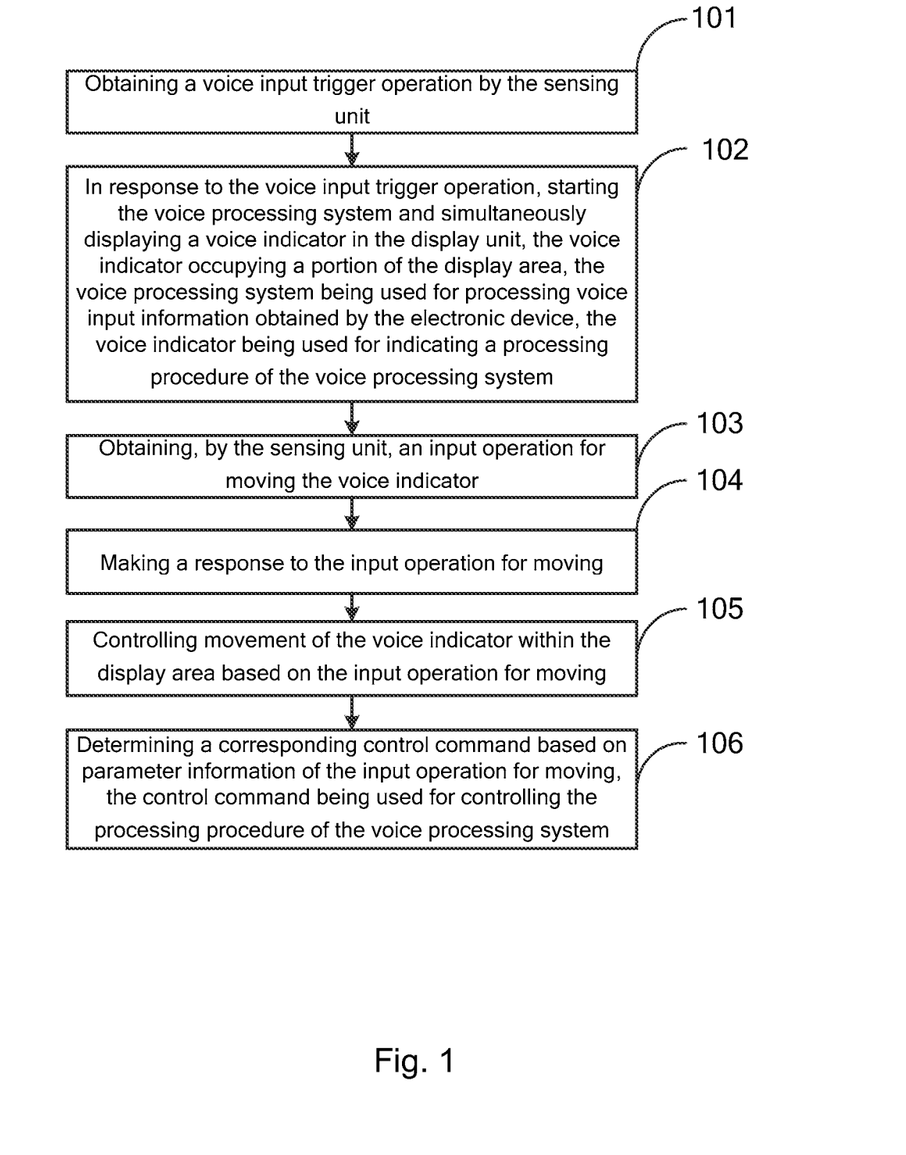
FIG. 1 is a main flow chart of an information processing method according to embodiments of the present invention.

With reference to FIG. 1, an embodiment of the present invention provides an information processing method. The method is applied in an electronic device. The electronic device comprises a display unit, a sensing unit and a voice processing system. The display unit comprises a display area. The method may comprise the following steps.

In step 101, a voice input trigger operation is obtained by the sensing unit.

In the embodiment of the invention, the sensing unit may be a sensor provided in the electronic device. For example, the display unit is a touch sensing screen. Touch operations performed on the surface of the display unit can be obtained by this sensor, thereby tasks corresponding to these operations can be performed accordingly. For example, when the user touches a Return key set in the electronic device, existence of a trigger operation on the Return key can be determined by the sensing unit.

In the embodiment of the present invention, the voice trigger operation may be used to start operations of the voice processing system. Preferably, the electrical device may have a specific key which is set in advance for starting the voice processing system. For example, the specific key may be a Menu key in a keyboard or in a screen. By clicking the specific key, the electronic device can obtain the trigger operation.

In the embodiment of the present invention, obtaining the voice input trigger operation by the sensing unit my particularly comprise: obtaining a sliding operation trajectory by the sensing unit; and, when it is determined that a sliding operation corresponding to the sliding operation trajectory is an operation that goes away from a first edge of the display area, determining the sliding operation as the voice input trigger operation, wherein the first edge is an edge in a horizontal direction of the edges contained in the display area, and wherein the display area may be the area of the display unit which can be used for displaying, and the first edge may refer to one of the edges of the display area which is in the horizontal direction and adjacent to a lower end of the electronic device.

Preferably, in the embodiment of the present invention, the sliding operation may be an operation which slides from the first edge to other positions in the display area. For example, when a user uses his forefinger to slide from an area close to the lower end of the screen of the mobile phone to an area in the middle region of the screen, the electronic device can obtain the sliding operation trajectory corresponding to the sliding operation, and can then determine the sliding operation as an operation going away from the first edge according to the sliding operation, and can thus consider the sliding operation as the voice input trigger operation for starting the operations of the voice processing system.

In step 102, in response to the voice input trigger operation, the voice processing system is started and simultaneously a voice indicator is displayed in the display unit, the voice indicator occupying a portion of the display area, the voice processing system being used for processing the voice input information obtained by the electronic device, the voice indicator being used for indicating the processing procedure of the voice processing system In the embodiment of the invention, after the electronic device obtains the voice input trigger operation, and when the voice processing system is started in response to the voice input trigger operation, a corresponding voice indicator can be displayed in the display area. For example, the identified area in the display area occupied by the voce indicator can be a full column bar, which has the same display screen width as that of the display area, but has a different screen display length from that of the display area. For example, when the voice indicator is displayed in the display area, the voice indicator can occupy a small portion of the display area.

Figure 2:
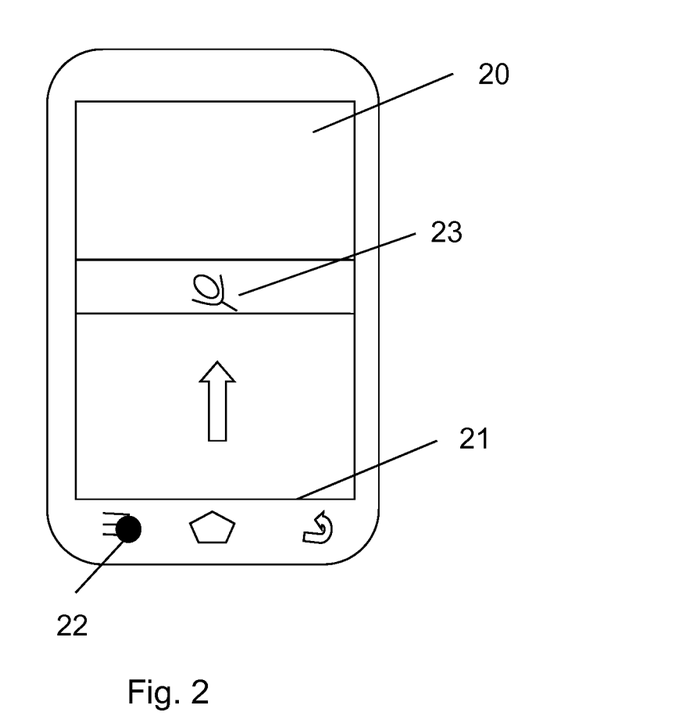
FIG. 2 is a schematic diagram showing a voice input trigger operation.

With reference to FIG. 2, the reference numeral 20 denotes the display area, the reference numeral 21 denotes the first edge, the reference numeral 22 denotes the voice input trigger operation, i.e. the sliding operation, the arrow in the display area represents that the sliding operation is an upward operation progressively going away from the first edge, the reference numeral 23 represents the voice indicator corresponding to the voice processing system, and the identified area of the voice indicator is displayed as the full column bar in the display area.

Preferably, in the embodiment of the present invention, the voice indicator may be indication information of respective processing stages of the processing procedure when the voice processing system is processing the voice input information. For example, when the voice processing system processes voice information input by the user, the processing procedure may comprise waiting for listening, listening, recognizing etc., and the voice indicator can indicate the corresponding processing degrees of these procedures. For example, when the voice processing system is performing speech recognition processing for the voice input information, the voice indicator may indicate the state of progress of the recognition processing. For example, the voice indicator can indicate the degree of the progress by a display ratio in a specific area of the display area. When 50% of the progress is done, the display ratio corresponding to the voice indicator is half of that specific area. Thus, a person can learn the current processing degree of the voice processing system, even the progress degree of the corresponding stage in the processing procedure, by observing the voice indicator, which facilitates the user to learn the current processing state in real time.

Preferably, in the embodiment of the present invention, when the voice input trigger operation is the sliding operation, displaying the voice indicator in the display unit may comprise, according to an end point of the sliding operation trajectory, determining the corresponding display position of the voice indicator in the display area; and displaying the voice indicator according to the display position. That is, the final display position of the voice indicator is determined by the sliding operation.

Typically, when the voice processing system is started by the sliding operation, the voice indicator corresponding to the voice processing system gradually appears in the display area, and the voice indicator will slide with the sliding operation till the end point of the sliding operation trajectory corresponding to the sliding operation. In other words, the voice indicator will move directly, according to the sliding operation trajectory corresponding to the sliding operation, to the end point of the sliding operation trajectory and display in a corresponding position in the display area, so that the user may have better viewing and operating experience.

In step 103, an input operation for moving the voice indicator is obtained by the sensing unit.

In the embodiment of the invention, the input operation for moving may be an operation present in the display unit for moving the voice indicator. For example, the voice indicator is moved from a first region position of the display area to a second region position of the display area. That is, the input operation for moving can change the region position in the display area where the voice indicator is located.

In step 104, a response to the input operation for moving is made.

In the embodiment of the invention, after the input operation for moving is obtained by the sensing unit, the electronic device may make a response to the input operation for moving, so as to realize a corresponding response event.

In step 105, the voice indicator is controlled to be moved within the display area based on the input operation for moving.

In the embodiment of the invention, because the input operation for moving is an operation for moving the voice indicator within the display area, the electronic device can control movement of the voice indicator within the display area based on the input operation for moving, in response to the input operation for moving.

For example, when the voice indicator is located in the middle region of the display area, if the input operation for moving is an operation for moving the voice indicator from the middle region to a top region, during the movement, the electronic device can obtain the input operation for moving and a corresponding moving operation trajectory by the sensing unit. Thus, when making a response to the input operation for moving, the ending position, i.e. the top region of the display area, of the movement of the voice indicator can be determined by the moving operation trajectory, so that the voice indicator is controlled to move to the region along with the input operation for moving.

In step 106, a corresponding control command is determined based on parameter information of the input operation for moving, wherein the control command is used for controlling the processing procedure of the voice processing system.

In the embodiment of the present invention, during the movement of the voice indicator by using the input operation for moving, the electronic device can obtain parameter information of the input operation for moving. For example, the parameter information can be information about the moving direction, information about the moving distance etc.

Preferably, in the embodiment of the present invention, the voice processing system may have M processing stages corresponding to M prompt effects which are different from each other, wherein M is a positive integer no less than 1; after determining a corresponding control command based on parameter information of the input operation for moving, the method further comprises: during the procedure of processing the voice input information by the voice processing system, displaying on a real-time basis, in the region identified by the voice indictor, i-th prompt effect corresponding to an i-th processing stage in which the voice processing system is situated, wherein i is a positive integer no greater than M.

In the embodiment of the invention, the M processing stages may be processing stages of the processing procedure of the voice processing system for processing the voice input information. For example, in a case that the user inputs a telephone number by voice, the M processing stages may comprise stages of listening and reorganization, calling the number etc., and each of the stages may have respective prompt effects. The M prompt effects may correspond to the M processing stages, respectively. Each of the M prompt effects can be different from each other, but the prompting way for the M processing stages may be the same. For example, each of the M processing stages has the same way for prompting, i.e. showing a wave shape in the identified area to represent the current processing progress. In such a case, different prompt effects can be showed by different colors of the wave shape, so as to represent being in different processing stages.

Preferably, in the embodiment of the invention, during the procedure of the voice processing system for processing voice input information, if the current stage is determined as the i-th processing stage, the i-th prompt effect corresponding to the i-th processing stage can be displayed in the identified region corresponding to the voice indictor. For example, showing a red wave shape zone in the identified region indicates that the current stage is the voice recognition stage; or, showing a green wave shape zone in the identified region indicates that the current stage is a stage sending a message or calling a number.

Preferably, in the embodiment of the present invention, in a case that the voice processing system has M processing stages corresponding to M prompt effects which are different from each other, and each of the M processing stages has corresponding output content, wherein M is a positive integer no less than 1; after determining a corresponding control command based on parameter information of the input operation for moving, the method may further comprise: during the procedure of processing the voice input information by the voice processing system, obtaining on a real-time basis, j-th output content corresponding to the j-th processing stage in which the voice processing system is situated, and overlaying the j-th output content on the j-th prompt effect corresponding to the j-th processing stage in which the voice processing system is situated for displaying in the region identified by the voice indictor, wherein j is a positive integer no greater than M.

In the embodiment of the present invention, the output content may be text contents of the M processing stages, such as in listening, in recognition, in transmission, in calling etc.

Figure 3:
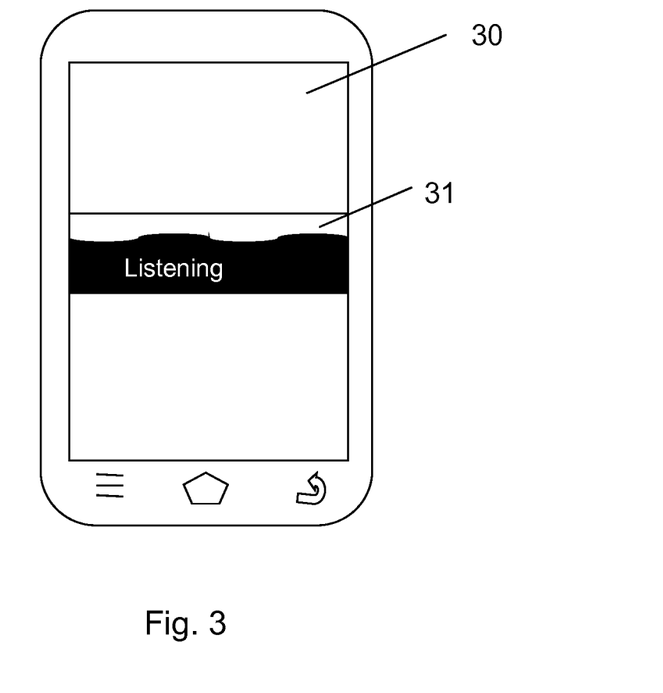
FIG. 3 is a schematic diagram showing a prompt effect and output contents in the identified area in an embodiment of the present invention.

In the embodiment of the invention, after determining the j-th prompt effect and the j-th output content corresponding to the j-th processing stage currently situated in, both the j-th prompt effect and the j-th output content are simultaneously displayed in the identified region. With reference to FIG. 3, numeral 30 denotes the display area, numeral 31 denotes the identified region, the output content displayed in the identified region is "in listening", and the corresponding prompt way is in a wave shape representing the degree of the progress of this processing stage, the color of the wave corresponds to the prompt effect of this processing stage, which can be red, green, or other color (all of them are embodied as black in the figures).

Preferably, in the embodiment of the present invention, if each of the M processing stages has N corresponding control commands, and different processing stages correspond to different control commands, before determining a corresponding control command based on parameter information of the input operation for moving, the method may further comprise: during the procedure of processing the voice input information by the voice processing system, displaying on a real-time basis, around the voice indictor, command logos of the N control commands corresponding to the processing stage in which the voice processing system is situated according to a predetermined relationship, so that the corresponding control command can be determined based on the parameter information of the input operation for moving.

The predetermined relationship can be determined according to a display position corresponding to an ending time of the voice indicator and the N control commands. For example, different region positions in the display area may correspond to different control commands. When the voice indicator is located in one of the region positions, a predetermined relationship between the control command corresponding to this region position and the voice indicator will be established.

In the embodiment of the invention, the N control commands can also be control commands each of which is used to control each of the M processing stages. For example, if the input voice information inputted is telephone number information and the current processing stage is a "in calling" stage as recognized by the voice processing system, the command logos corresponding to the N control commands of the processing stage can be identifiers such as "call now", "repeat again", or "exist" etc., the command region of each of the N control commands in the display area can be determined according to the predetermined relationship, wherein the command region can be around (e.g. adjacent to or alternative to) the identified region occupied by the voice indicator, and the command logo can be displayed in the corresponding command region. For example, the command logo corresponding to a first command region is "call now", and the first command region can be adjacent to the identified region and located above the identified region.

Figure 4:
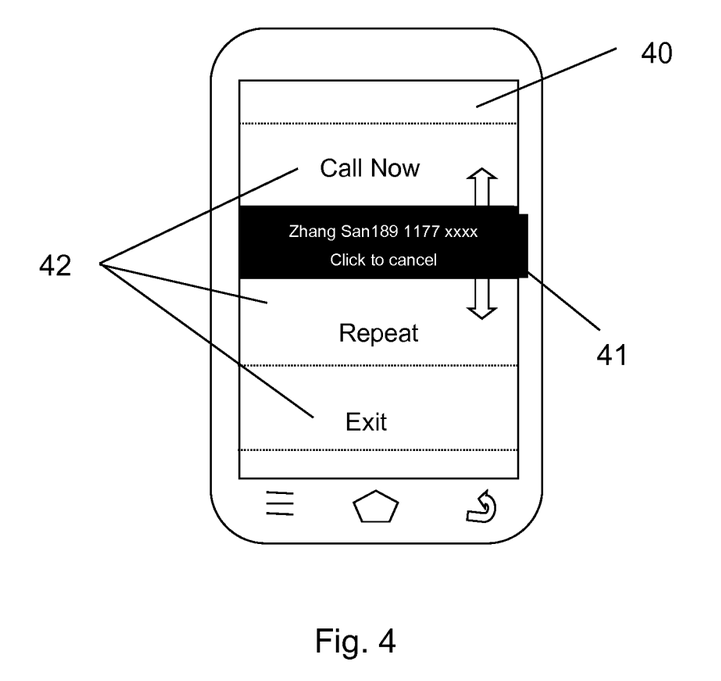
FIG. 4 is a schematic diagram showing a command logo in an embodiment of the present invention.

With reference to FIG. 4, numeral 40 denotes the display area, numeral 41 denotes a identified region corresponding to the voice indicator, numeral 42 represents that the command logos corresponding to the N control commands are shown around (i.e. upper and lower than) the identified region. The arrows in the FIG. 4 represent moving the voice indicator to a corresponding command region by the input operation for moving, so as to determine a corresponding control command. Thus, the user can perform corresponding commands, such as "call now" or "re-enter voice", by moving the voice indicator to the different regions.

Preferably, in the embodiment of the invention, when the voice input information entered by a user is some contact's contact information, such as "calling Zhang San", the voice processing system can find the number of Zhang San in the phone book after voice reorganization. At this time, the telephone number of Zhang San, such as "Zhang San189 1177 xxxx", can be displayed in the identified area where the voice indicator is located, and the user may perform the input operation for moving the identified region upward to the command region with "call now", so as to place a call to the number.

Or, in a case that the contact Zhang San has several contact manners, one of the N control commands can be a control command of "view more". For example, this control command can display "More" in the command region under the identified region of the voice indicator. When the obtained parameter information of the input operation for moving indicates moving downward and to the command regions of "More", the remaining of the contact manners can be displayed, thereby facilitating the user to view. For example, the user switches and views contact details by a sliding operation by the thumb. After particular contact information is selected, the contact information can be moved by the input operation for moving upward for calling, thereby facilitating the user to operate by one hand.

Figure 5:
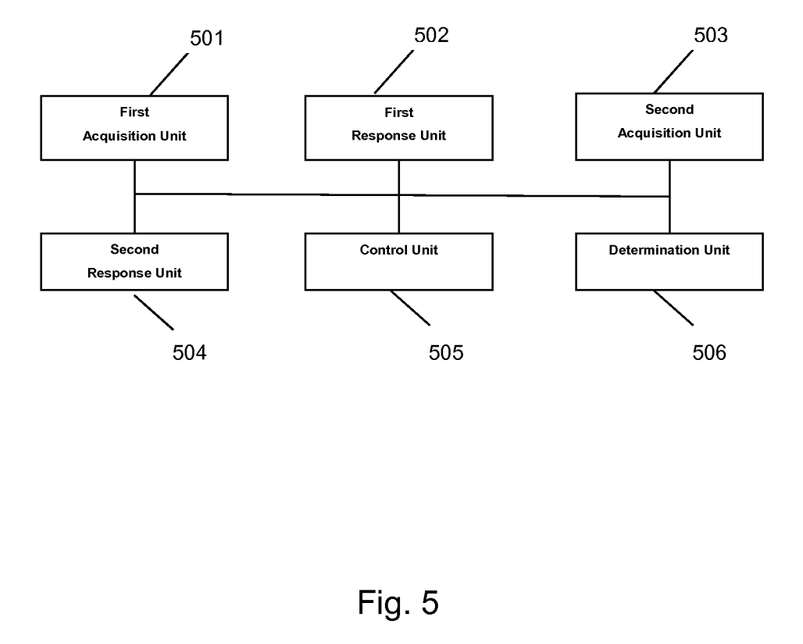
FIG. 5 is a schematic diagram showing a main structure of an electronic device according to an embodiment of the present application.

With reference to FIG. 5, an embodiment of the invention provides an electronic device that comprises a display unit, a sensing unit and a voice processing system, the display unit comprising a display area, and the electronic device further comprises: a first acquisition unit 501, a first response unit 502, a second acquisition unit 503, a second response unit 504, a control unit 505 and a determining unit 506.

The first acquisition unit 501 can obtain a voice input trigger operation by the sensing unit.

The first response unit 502 can, in response to the voice input trigger operation, start the voice processing system and simultaneously display a voice indicator in the display unit, the voice indicator occupying a portion of the display area, the voice processing system being used for processing the voice input information obtained by the electronic device, the voice indicator being used for indicating the processing procedure of the voice processing system.

The second acquisition unit 503 can obtain an input operation for moving the voice indicator by the sensing unit.

The second response unit 504 can make a response to the input operation for moving.

The control unit 505 can control movement of the voice indicator within the display area based on the input operation for moving.

The determining unit 506 can determine a corresponding control command based on parameter information of the input operation for moving, the control command being used for controlling the processing procedure of the voice processing system.

Preferably, the voice processing system has M processing stages corresponding to M prompt effects which are different from each other, and wherein M is a positive integer no less than 1. The electronic device can further comprise a first processing unit configure to, during the procedure of processing the voice input information by the voice processing system, display on a real-time basis, in the region identified by the voice indictor, i-th prompt effect corresponding to an i-th processing stage in which the voice processing system is situated, wherein i is a positive integer no greater than M.

Preferably, the voice processing system has M processing stages corresponding to M prompt effects which are different from each other, and each of the M processing stages has a corresponding output content, wherein M is a positive integer no less than 1. The electronic device can further comprise a second processing unit configure to, during the procedure of processing the voice input information by the voice processing system, obtain on a real-time basis the j-th output content corresponding to the j-th processing stage in which the voice processing system is situated, and overlay the j-th output content on the j-th prompt effect corresponding to the j-th processing stage in which the voice processing system is currently situated for displaying in the region identified by the voice indictor, wherein j is a positive integer no greater than M.

Preferably, each of the M processing stages have N corresponding control commands, and different processing stages correspond to different control commands. The electronic device can further comprise a third processing unit configure to, during the procedure of processing the voice input information by the voice processing system, display on a real-time basis, around the voice indictor, command logos of the N control commands corresponding to the processing stage in which the voice processing system is situated according to a predetermined relationship, so that the corresponding control command can be determined based on the parameter information of the input operation for moving.

Preferably, the predetermined relationship is determined according to the display position corresponding to the ending time of the voice indicator and the N control commands.

Preferably, the first acquisition unit 501 can be further configured to: obtain a sliding operation trajectory by the sensing unit, and when it is determined that a sliding operation corresponding to the sliding operation trajectory is an operation that goes away from a first edge of the display area, determine the sliding operation as the voice input trigger operation, wherein the first edge is an edge in a horizontal direction of the edges contained in the display area.

Preferably, the first response unit 502 can be further configured to: determine a corresponding display position of the voice indicator in the display area, according to an end point of the sliding operation trajectory, and display the voice indicator based on the display position.

The information processing method according to the embodiments of the present invention can be applied in an electronic device. The electronic device comprises a display unit, a sensing unit and a voice processing system. The display unit comprises a display area. The method comprises: obtaining a voice input trigger operation by the sensing unit; in response to the voice input trigger operation, starting the voice processing system and simultaneously displaying a voice indicator in the display unit, the voice indicator occupying a portion of the display area, the voice processing system being used for processing the voice input information obtained by the electronic device, the voice indicator being used for indicating the processing procedure of the voice processing system; obtaining an input operation for moving the voice indicator by the sensing unit; making a response to the input operation for moving; controlling movement of the voice indicator within the display area based on the input operation for moving; determining a corresponding control command based on parameter information of the input operation for moving, the control command being used for controlling the processing procedure of the voice processing system.

In the embodiments of the invention, when the voice processing system is called up, the corresponding voice indicator occupies a portion of the display area, and does not completely shield other application interfaces in the display unit, and thus the electronic device has a better display effect. In addition, when the input operation for moving is obtained, the corresponding control command can be determined based on parameter information of the input operation for moving, and then the processing responded by the voice processing system can be controlled accordingly. That is, movement of the voice indicator within the display area can be controlled based on the input operation for moving, and the control command can be determined based on parameters of the input operation for moving. For example, when the voice content corresponding to the voice indicator is a telephone number, if the input operation for moving is an operation to slide the voice indicator from a middle position in the display area to a top position, it can be determined that the control command corresponding to the parameters of the input operation for moving is a command to place a call to the telephone number. Thus, when a user holds the electronic device by one hand, he only needs to arrange the voice indicator to different positions in the display area by sliding his thumb, in order to determine corresponding control commands, whereby controlling the voice processing system to perform the control commands, and thus implementing corresponding functions. Such an operation mode is more flexible for the user, has better user experience and more sensitive response of the electronic device, and provides richer response ways.

Specifically, computer program instructions corresponding to the information processing method according to the embodiments of the present invention may be stored on an optical disk, a hard drive, a U disk or other storage medium. The computer program instructions corresponding to the information processing method stored on the storage medium can cause an electronic device to perform the following steps, when read or executed by the electronic device:

obtaining a voice input trigger operation by the sensing unit;

in response to the voice input trigger operation, starting the voice processing system and simultaneously displaying a voice indicator in the display unit, the voice indicator occupying a portion of the display area, the voice processing system being used for processing the voice input information obtained by the electronic device, the voice indicator being used for indicating the processing procedure of the voice processing system;

obtaining an input operation for moving the voice indicator by the sensing unit;

making a response to the input operation for moving;

controlling movement of the voice indicator within the display area based on the input operation for moving;

determining a corresponding control command based on parameter information of the input operation for moving, the control command being used for controlling the processing procedure of the voice processing system.

Alternatively, the storage medium further stores other computer instructions which are executed after the computer instructions corresponding to the step of determining a corresponding control command based on parameter information of the input operation for moving are executed. When executed, the another computer instructions cause the electronic device to perform steps of: during the procedure of processing the voice input information by the voice processing system, displaying on a real-time basis, in the region identified by the voice indictor, the i-th prompt effect corresponding to the i-th processing stage in which the voice processing system is situated, wherein i is a positive integer no greater than M.

Alternatively, the storage medium further stores other computer instructions which are executed after the computer instructions corresponding to the step of determining a corresponding control command based on parameter information of the input operation for moving are executed. The other computer instructions cause the electronic device to perform steps of: during the procedure of processing the voice input information by the voice processing system, obtaining on a real-time basis the j-th output content corresponding to the j-th processing stage in which the voice processing system is situated, and overlaying the j-th output content on the j-th prompt effect corresponding to the j-th processing stage in which the voice processing system is currently situated for displaying in the region identified by the voice indictor, wherein j is a positive integer no greater than M. This step is performed after determining a corresponding control command based on parameter information of the input operation for moving.

Alternatively, the storage medium further stores other computer instructions which are executed before the computer instructions corresponding to the step of determining a corresponding control command based on parameter information of the input operation for moving are executed. The other computer instructions cause the electronic device to perform steps of:

during the procedure of processing the voice input information by the voice processing system, displaying on a real-time basis, around the voice indictor, command logos of the N control commands corresponding to the processing stage in which the voice processing system is situated according to a predetermined relationship, so as to allow to determine the corresponding control command based on the parameter information of the input operation for moving.

Alternatively, the storage medium further stores other computer instructions which are executed before the computer instructions corresponding to the step of determining a corresponding control command based on parameter information of the input operation for moving are executed. The other computer instructions cause the electronic device to perform steps as below.

Alternatively, the computer instructions corresponding to the step of obtaining the voice input trigger operation by the sensing unit stored in the storage medium can cause the electronic device to perform the following steps:

obtaining a sliding operation trajectory by the sensing unit;

when it is determined that the sliding operation corresponding to the sliding operation trajectory is an operation that goes away from the first edge of the display area, determining the sliding operation as the voice input trigger operation, wherein the first edge is an edge in a horizontal direction of the edges contained in the display area.

Obviously, those skilled in the art can make various modifications and variations of the invention without departing from the spirit and scope of the invention. Thus, if these modifications and variations fall within the range of the claims of the present invention and their technical equivalents, the present invention is also intended to include these modifications and modifications.

I claim:

1. An information processing method applied in an electronic device, the electronic device comprising a display unit, a sensing unit and a voice processing system, the display unit comprising a display area, and the method comprising:

obtaining a sliding operation as a voice input trigger operation by the sensing unit from a user;

in response to the voice input trigger operation, starting the voice processing system and simultaneously displaying a voice indicator in the display unit, the voice indicator occupying a portion of the display area;

obtaining a voice content from the user and representing the voice content as the voice indicator and processing the voice content using the voice processing system, the voice indicator being used for indicating a processing procedure of the voice processing system;

obtaining, by the sensing unit, an input operation, which is made by the user on the display unit, by moving the voice indicator and a moving operation trajectory of the input operation;

making a response to the input operation based on the moving;

controlling movement of the voice indicator within the display area along with the input operation for moving by determining an ending position of the movement of the voice indicator based on the moving operation trajectory of the input operation;

determining a corresponding control command based on parameter information of the input operation, the control command being used for controlling the processing procedure of the voice processing system by processing the voice content in accordance with the determined control command.

2. The method according to claim 1; wherein the voice processing system has M processing stages corresponding to M prompt effects which are different from each other, and wherein M is a positive integer no less than 1; after determining the corresponding control command based on the parameter information of the input operation for moving, the method further comprises:

during the procedure of processing the voice input information by the voice processing system, displaying on a real-time basis, in a region identified by the voice indictor, i-th prompt effect corresponding to an i-th processing stage in which the voice processing system is situated, wherein i is a positive integer no greater than M.

3. The method according to claim 1, wherein the voice processing system has M processing stages corresponding to M prompt effects which are different from each other, and each of the M processing stages has corresponding output content, wherein M is a positive integer no less than 1; after determining the corresponding control command based on the parameter information of the input operation for moving, the method further comprises:

during the procedure of processing the voice input information by the voice processing system, obtaining on a real-time basis, j-th output content corresponding to a j-th processing stage in which the voice processing system is situated, and overlaying the j-th output content on the j-th prompt effect corresponding to the j-th processing stage in which the voice processing system is situated for displaying in the region identified by the voice indictor, wherein j is a positive integer no greater than M.

4. The method according to claim 2, wherein each of the M processing stages corresponds to N control commands, and different processing stages correspond to different control commands; before determining the corresponding control command based on the parameter information of the input operation for moving, the method further comprises:

during the procedure of processing the voice input information by the voice processing system, displaying on a real-time basis, around the voice indictor, command logos of the N control commands corresponding to the processing stage in which the voice processing system is situated according to a predetermined relationship, so that the corresponding control command can be determined based on the parameter information of the input operation for moving.

5. The method according to claim 3, wherein each of the M processing stages corresponds to N control commands, and different processing stages correspond to different control commands; before determining the corresponding control command based on the parameter information of the input operation for moving, the method further comprises:

during the procedure of processing the voice input information by the voice processing system, displaying on a real-time basis, around the voice indictor, command logos of the N control commands corresponding to the processing stage in which the voice processing system is situated according to a predetermined relationship, so that the corresponding control command can be determined based on the parameter information of the input operation for moving.

6. The method according to claim 4, wherein the predetermined relationship is determined according to a display position corresponding to an ending time of the voice indicator and the N control commands.

7. The method according to claim 5, wherein the predetermined relationship is determined according to a display position corresponding to an ending time of the voice indicator and the N control commands.

8. The method according to claim 1, wherein obtaining the voice input trigger operation by the sensing unit comprises:

obtaining a sliding operation trajectory by the sensing unit;

when it is determined that a sliding operation corresponding to the sliding operation trajectory is an operation that goes away from a first edge of the display area, determining the sliding operation as the voice input trigger operation, wherein the first edge is an edge in a horizontal direction of the edges contained in the display area.

9. The method according to claim 8, wherein displaying the voice indicator in the display unit comprises:

determining a corresponding display position of the voice indicator in the display area, according to an end point of the sliding operation trajectory; and displaying the voice indicator based on the display position.

10. An electronic device, the electronic device comprising a display unit, a sensor and a voice processing system, the display unit comprising a display area, and the method comprising:

a first acquisition sensor configured to obtain a sliding operation from a user as a voice input trigger operation by the sensor;

a first response sensor configured to, in response to the voice input trigger operation, start the voice processing system and simultaneously display a voice indicator in the display unit, the voice indicator occupying a portion of the display area, the voice processing system obtaining a voice content from the user and representing the voice content as the voice indicator and processing the voice content using the voice processing system, the voice indicator being used for indicating a processing procedure of the voice processing system;

a second acquisition sensor configured to obtain, by the sensor, an input operation, which is made by a the user on the display unit, by moving the voice indicator and a moving operation trajectory of the input operation;

a second response sensor configured to make a response to the input operation based on the moving;

a control sensor configured to control movement of the voice indicator within the display area along with the input operation for moving by determining an ending position of the movement of the voice indicator based on the moving operation trajectory of the input operation;

a determining sensor configured to determine a corresponding control command based on parameter information of the input operation, the control command being used for controlling the processing procedure of the voice processing system by processing the voice content in accordance with the determined control command.

11. The electronic device according to claim 10, wherein the voice processing system has M processing stages corresponding to M prompt effects which are different from each other, and wherein M is a positive integer no less than 1; the electronic device further comprises a first storage medium configure to, during the procedure of processing the voice input information by the voice processing system, display on a real-time basis, in a region identified by the voice indictor, i-th prompt effect corresponding to an i-th processing stage in which the voice processing system is situated, is a positive integer no greater than M.

12. The electronic device according to claim 10, wherein the voice processing system has M processing stages corresponding to M prompt effects which are different from each other, and each of the M processing stages has corresponding output content, wherein M is a positive integer no less than 1; the electronic device further comprises a second storage medium configure to, during the procedure of processing the voice input information by the voice processing system, obtain on a real-time basis j-th output content corresponding to a j-th processing stage in which the voice processing system is situated, and overlay the j-th output content on the j-th prompt effect corresponding to the j-th processing stage, in which the voice processing system is situated for displaying in the region identified by the voice indictor, wherein j is a positive integer no greater than M.

13. The electronic device according to claim 11, wherein each of the M processing stages corresponds to N control commands, and different processing stages correspond to different control commands; the electronic device further comprises a third storage medium configure to, during the procedure of processing the voice input information by , the voice processing system, display on a real-time basis, around the voice indictor, command logos of the N control commands corresponding to the processing stage, in which the voice processing system is situated according to a predetermined relationship, so that the corresponding control command can be determined based on the parameter information of the input operation for moving.

14. The electronic device according to claim 12, wherein each of the M processing stages corresponds to N control commands, and different processing stages correspond to different control commands; the electronic device further comprises a third storage medium configure to, during the procedure of processing the voice input information by the voice processing system, display on a real-time basis, around the voice indictor, command logos of the N control commands corresponding to the processing stage in which the voice processing system is situated according to a predetermined relationship, so that the corresponding control command can be determined based on the parameter information of the input operation for moving.

15. The electronic device according to claim 13, wherein the predetermined relationship is determined according to a display position corresponding to an ending time of the voice indicator and the N control commands.

16. The electronic device according to claim 14, wherein the predetermined relationship is determined according to a display position corresponding to an ending time of the voice indicator and the N control commands.

17. The electronic device according to claim 10, wherein the first acquisition sensor is further configured to
- obtain a sliding operation trajectory by the sensor;
- when it is determined that a sliding operation corresponding to the sliding operation trajectory is an operation that goes away from a first edge of the display area, determine the sliding operation as the voice input trigger operation, wherein the first edge is an edge in a horizontal direction of the edges contained in the display area.

18. The electronic device according to claim 17, wherein the first response sensor is further configured to
- determine a corresponding display position of the voice indicator in the display area, according to an end point of the sliding operation trajectory; and
- display the voice indicator based on the display position.

* * * * *